United States Patent [19]

Euverard

[11] 4,128,165

[45] Dec. 5, 1978

[54] CHAIN CONVEYOR ASSEMBLY

[75] Inventor: Maynard R. Euverard, Williamsburg, Va.

[73] Assignee: Velten & Pulver, Inc., Chicago Ridge, Ill.

[21] Appl. No.: 810,437

[22] Filed: Jun. 27, 1977

[51] Int. Cl.² ............................................. B65G 17/14
[52] U.S. Cl. .................................... 198/844; 198/853
[58] Field of Search ............... 198/831, 834, 844, 848, 198/849, 850, 851, 852, 853, 793, 652

[56] References Cited

U.S. PATENT DOCUMENTS

| | | | |
|---|---|---|---|
| 2,870,902 | 1/1959 | Rada et al. | 198/834 |
| 2,954,113 | 9/1960 | Hibbard et al. | 198/851 |
| 3,094,206 | 6/1963 | Stewart et al. | 198/840 |
| 3,214,007 | 10/1965 | Matthies et al. | 198/852 |
| 3,653,493 | 4/1972 | Kerr | 198/841 |
| 3,708,059 | 1/1973 | Ackermann | 198/841 |
| 3,910,406 | 10/1975 | Pulver et al. | 198/844 |
| 4,030,595 | 6/1977 | McCombie | 198/851 |

FOREIGN PATENT DOCUMENTS

| | | | |
|---|---|---|---|
| 801157 | 9/1958 | United Kingdom | 198/852 |
| 377109 | 6/1973 | U.S.S.R. | 198/851 |

Primary Examiner—Evon C. Blunk
Assistant Examiner—Richard K. Thomson
Attorney, Agent, or Firm—Vogel, Dithmar, Stotland, Stratman & Levy

[57] ABSTRACT

An articulated chain conveyor has a plurality of links joined together by connecting pins each having a socket formed axially therein. A conveying surface is formed by a plurality of wire rod structures each having two ends respectively received in the sockets of adjacent ones of the pins and a support portion overlying the chain and extending laterally therebeyond to provide a support surface. Welded and non-welded rod structures for single-chain conveyors and a non-welded rod structure for double-chain conveyors are disclosed. Also disclosed are T-shaped mounting members and cooperating clips for connecting wire rod structures to a conveyor chain.

25 Claims, 13 Drawing Figures

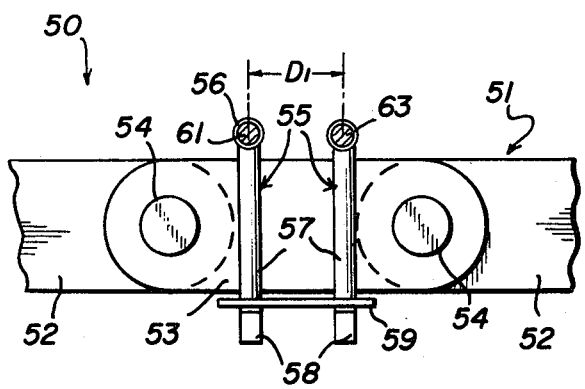
FIG.5
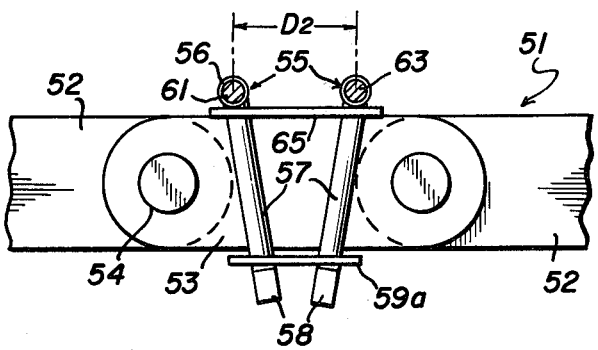
FIG.6
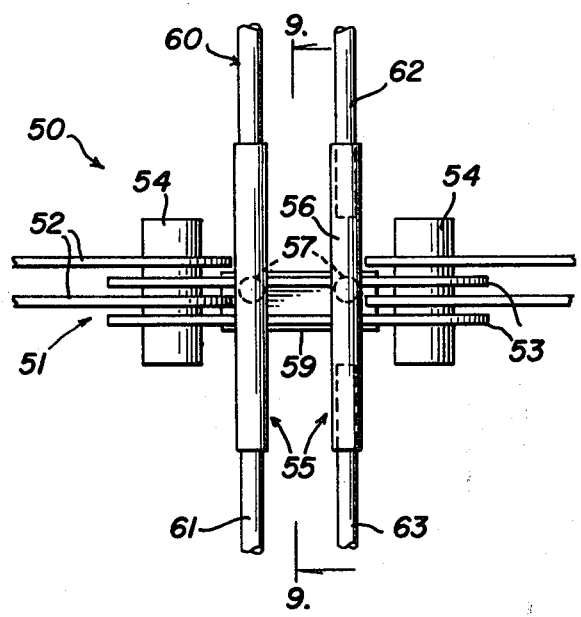
FIG.7
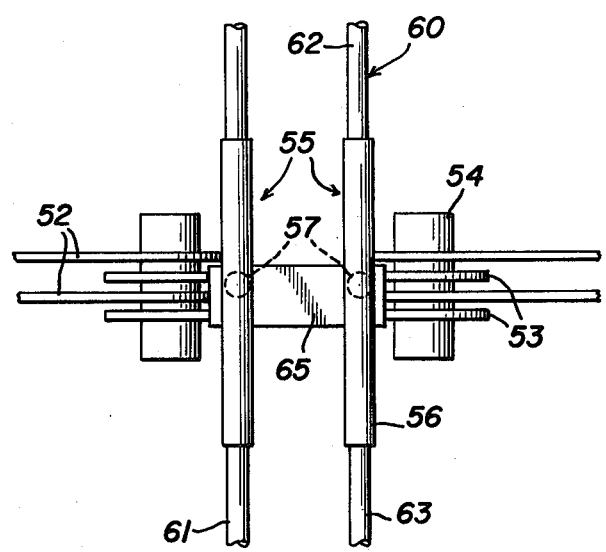
FIG.8
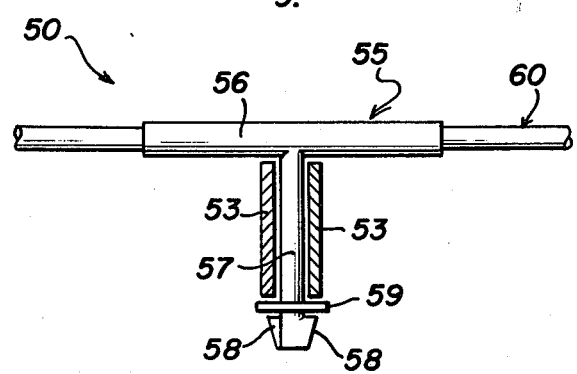
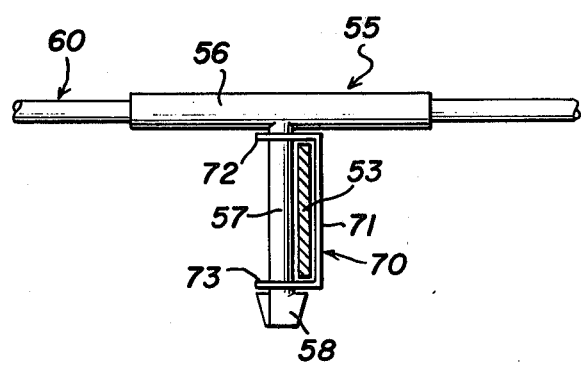
FIG.9
FIG.10

CHAIN CONVEYOR ASSEMBLY

BACKGROUND OF THE INVENTION

The present invention relates to conveyor belts of the articulated chain conveyor type which can be guided around curves and, in particular, to means for providing an article-support conveying surface for the conveyor belt.

Articulated chain conveyors have, in the past, been provided with a wide variety of support mechanisms either fixedly or detachably secured to the chain for providing an article-support conveying surface, many of which maintained the conveyed articles out of contact with the conveyor chains. Several such conveyors utilize wire rod structures for providing the conveying surface, exemplary prior art systems being disclosed in U.S. Pat. No. 3,094,206, issued to H. H. Stewart et al. on June 18, 1963, and U.S. Pat. No. 3,653,493, issued to D. M. Kerr on Apr. 4, 1972, U.S. Pat. No. 3,708,059, issued to H. Ackermann on Jan. 2, 1973, U.S. Pat. No. 3,910,406, issued on Oct. 7, 1975 to W. O. Pulver et al., as well as in my prior U.S. Pat. No. 3,842,969, issued on Oct. 22, 1974. Each of these prior art systems requires the use of a specially designed attachment mechanism for mounting the wire rod support members on the links of the chain conveyor. Many of these wire rod support members cannot be utilized with articulated chain conveyors with socketed link interconnection pins. Thus, heretofore, use of conveyors with wire rod support members has necessitated extensive costs in inventory not only of the support members, but also of specially designed articulated chains and attachment members.

Applicant's assignee manufactures and sells a line of articulated chain conveyors comprising a plurality of links interconnected by pins or rod end bearings which are either hollow or are provided with axial sockets therein as illustrated, for example, in U.S. Pat. Nos. 3,214,007, issued to W. Matthies et al. on Oct. 26, 1955 and 3,237,756, issued to W. C. Pulver on Mar. 1, 1966. Those patents disclose wire rod supports spanning the parallel chains of a two-chain conveyor and having the ends thereof received in the pin sockets.

SUMMARY OF THE INVENTION

The present invention is directed to article-support attachments for use with an articulated chain conveyor having links interconnected by socketed or non-socketed pins, and which support conveyed articles out of contact with the chain long linear or curved paths.

It is an important feature of the present invention to provide wire rod type article-support attachments having ends which are receivable in the sockets of the chain pins to provide a stable support surface and so that the wire rod members may be independently and easily mounted and demounted with respect to the conveyor chain.

It is another feature of this invention that the wire rod support members may be constructed and mounted on the conveyor chain without welding.

Another feature of this invention is the provision of wire rod support members for mounting on single chain as well as double-chain conveyors.

Another feature of the invention is the provision of adapter mounting members mountable on other types of articulated link conveyor chains and provided with socket means for receiving associated wire rod support members.

These important features are attained, and it is an object of the present invention to obtain these advantages by providing apparatus for providing a support surface for carrying goods and the like on an articulated chain conveyor having a plurality of links joined together by connecting pins each having a socket formed axially therein for receiving an end of an associated wire rod, the apparatus comprising a rod structure having two ends respectively received in the sockets of two adjacent ones of the associated pins, the rod structure having a support portion overlying the chain in use and extending laterally therebeyond to provide a support surface, a plurality of the rod structures mounted on the chain providing a conveying surface for transporting articles.

Further features of the invention pertain to the particular arrangement of the parts of the conveyor apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 5 is a fragmentary side elevational view, in partial vertical section, of a portion of a chain conveyor apparatus constructed in accordance with and embodying the features of a third embodiment of the present invention;

FIG. 6 is a view similar to FIG. 5, illustrating a fourth embodiment of the present invention;

FIG. 7 is a fragmentary top plan view of the apparatus illustrated in FIG. 5;

FIG. 8 is a fragmentary top plan view of the apparatus illustrated in FIG. 6;

FIG. 9 is a view in vertical section taken along the line 9—9 in FIG. 7;

FIG. 10 is a view similar to FIG. 9, and illustrating an alternative form of attachment clip;

DESCRIPTION OF THE PREFERRED EMBODIMENTS

Figure 1:
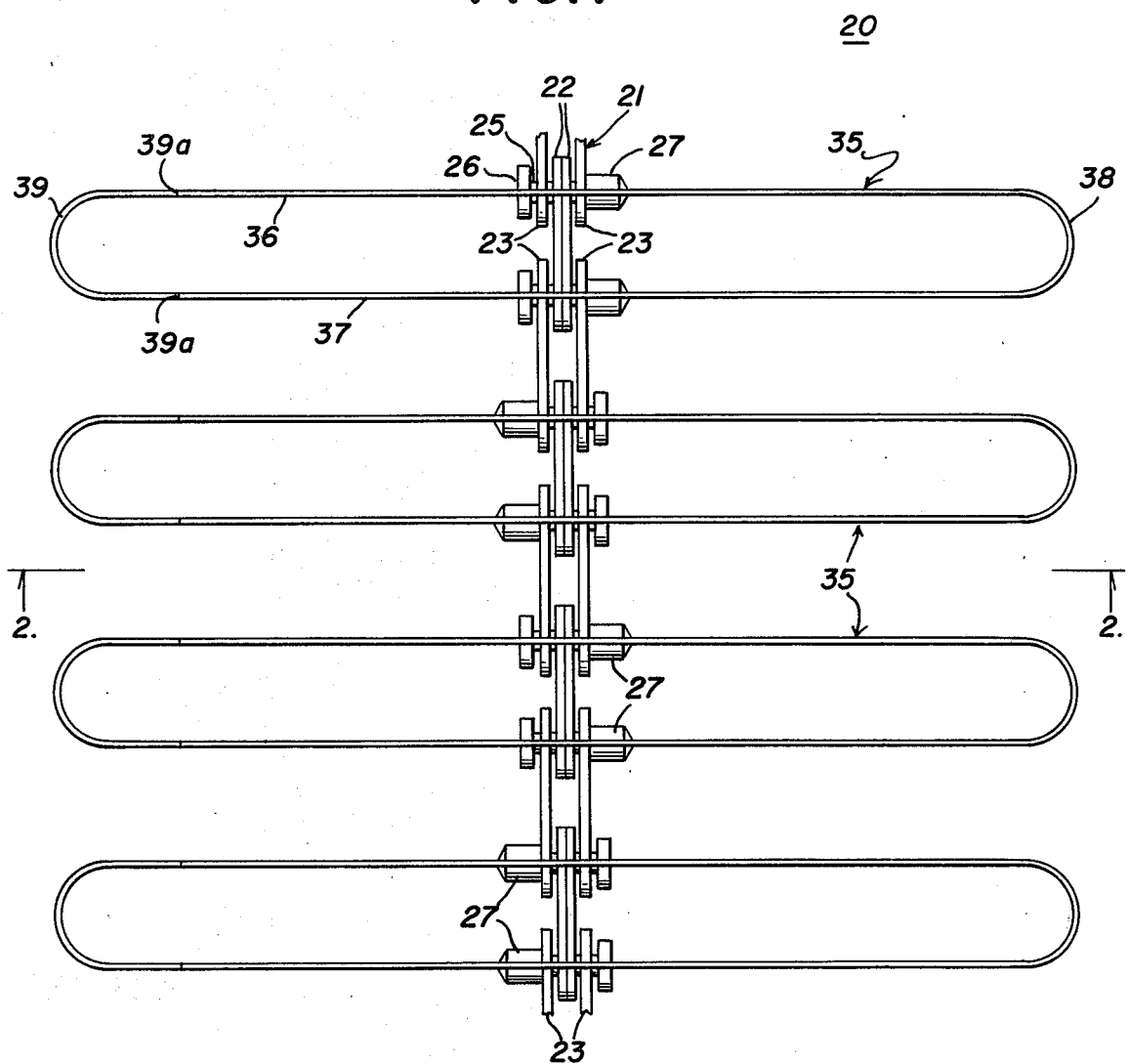
FIG. 1 is a fragmentary top plan view of an articulated conveyor chain having mounted thereon wire rod support members constructed in accordance with and embodying the features of a first embodiment of the present invention.
Figure 2:
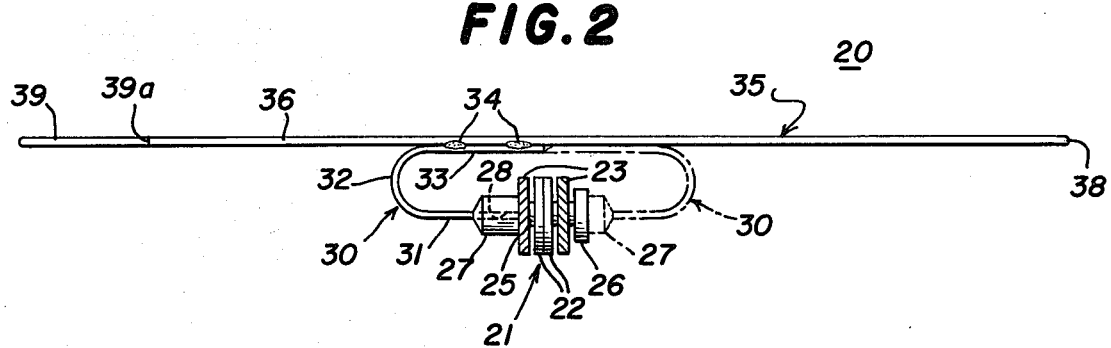
FIG. 2 is a view in vertical section, taken along the line 2—2 in FIG. 1.

Referring now to FIGS. 1 and 2 of the drawings, there is illustrated a first embodiment of a conveyor assembly, generally designated by the numeral 20, and including an articulated conveyor chain, generally designated by the numeral 21, and carrying thereon a plurality of support structures, each including a wire rod segment 30 and a wire rod loop 35. The chain 21 includes longitudinally spaced-apart pairs of inner links 22 and outer links 23, with the outer links 23 being respectively disposed along the outer side surfaces of the inner links 22, the ends of the outer links 23 overlapping the ends of the inner links 22 and being pivotally secured thereto by connecting pins or rod end bearings 25 extending through complementary openings therein. Each of the inner and outer links 22 and 23 is preferably formed as an elongated flat plate with rounded ends, all in a well-known manner.

Each of the connecting pins 25 has an enlarged diameter retaining collar 26 at one end thereof disposed outboard of the adjacent outer link 23 and an enlarged rod-end portion 27 at the other end thereof disposed outboard of the other outer link 23 for cooperation with the retaining head 26 to retain the pin 25 in place. Formed axially in the rod-end portion 27 is a cylindrical bore or socket 28. It will be appreciated that the conveyor chain 21 is of standard construction and, in normal use, is oriented with the axes of the pins 25 disposed substantially horizontally. In FIGS. 1 and 2 the pins 25 have been illustrated as disposed in alternating pairs, with the rod-end portions 27 of one pair being disposed on one side of the chain 21, and with the rod-end portions 27 of the next adjacent pair being disposed on the opposite side of the chain 21. But it will be appreciated that the chain 21 could be arranged with all of the pins 25 oriented in the same direction. The pins 25 may be formed of any suitable material, but are preferably formed of either nylon or steel.

Mounted on each of the pins 25 is a wire rod segment, generally designated by the numeral 30, which includes a straight lower end portion 31 dimensioned to be received axially into the socket 28 in the associated pin 25. The wire rod segment 30 is bent upwardly to form an arcuate bight portion 32 which terminates in a straight upper end portion 33 which extends in the same direction as the lower end portion 31 substantially parallel thereto a predetermined distance above the conveyor chain 21, the upper end portion 33 terminating substantially midway between the ends of the associated pin 25. Because of the arrangement of the pins 25 in alternate pairs, it will be appreciated that the wire rod segments 30 are also arranged in pairs which alternately project from the opposite sides of the chain 21.

Fixedly secured to each such pair of wire rod segments 30 in an elongated wire rod loop, generally designated by the numeral 35. Each loop 35 includes two elongated parallel side portions 36 and 37 which extend laterally of the chain 21 well beyond the opposite sides thereof, the side portions 36 and 37 being respectively supported on the upper end portions 33 of the associated pair of wire rod segments 30 parallel thereto and being fixedly secured thereto as by weldments 34. The side portions 36 and 37 are interconnected at the opposite ends thereof by arcuate bight portions 38 and 39 to form a closed loop which defines a support surface. Preferably, the side portions 36 and 37 and the bight portion 38 are all integrally formed of a single piece of wire rod, with the bight portion 39 being formed of a separate piece of wire rod which is joined to the ends of the side portions 36 and 37 at junctions 39a as by butt welding. It will be appreciated that the entire wire rod loop 35 could also be formed of a single piece of material with the opposite ends thereof joined together in a single butt weld.

The wire rod segments 30 are so dimensioned that the wire rod loops 35 all lie substantially in a common plane along segments of the conveyor chain 21 which are arranged in a straight line, whereby the wire rod loops 35 cooperate to define a conveying surface for supporting articles to be conveyed by the conveyor assembly 20. Each of the wire rod loops 35 may be prefabricated with its associated wire rod segment 30 to form a unitary wire rod structure which may be readily and independently mounted and demounted on the chain 21 simply by insertion of the lower end portions 31 in and removal of them from the corresponding pin sockets 28.

Figure 3:
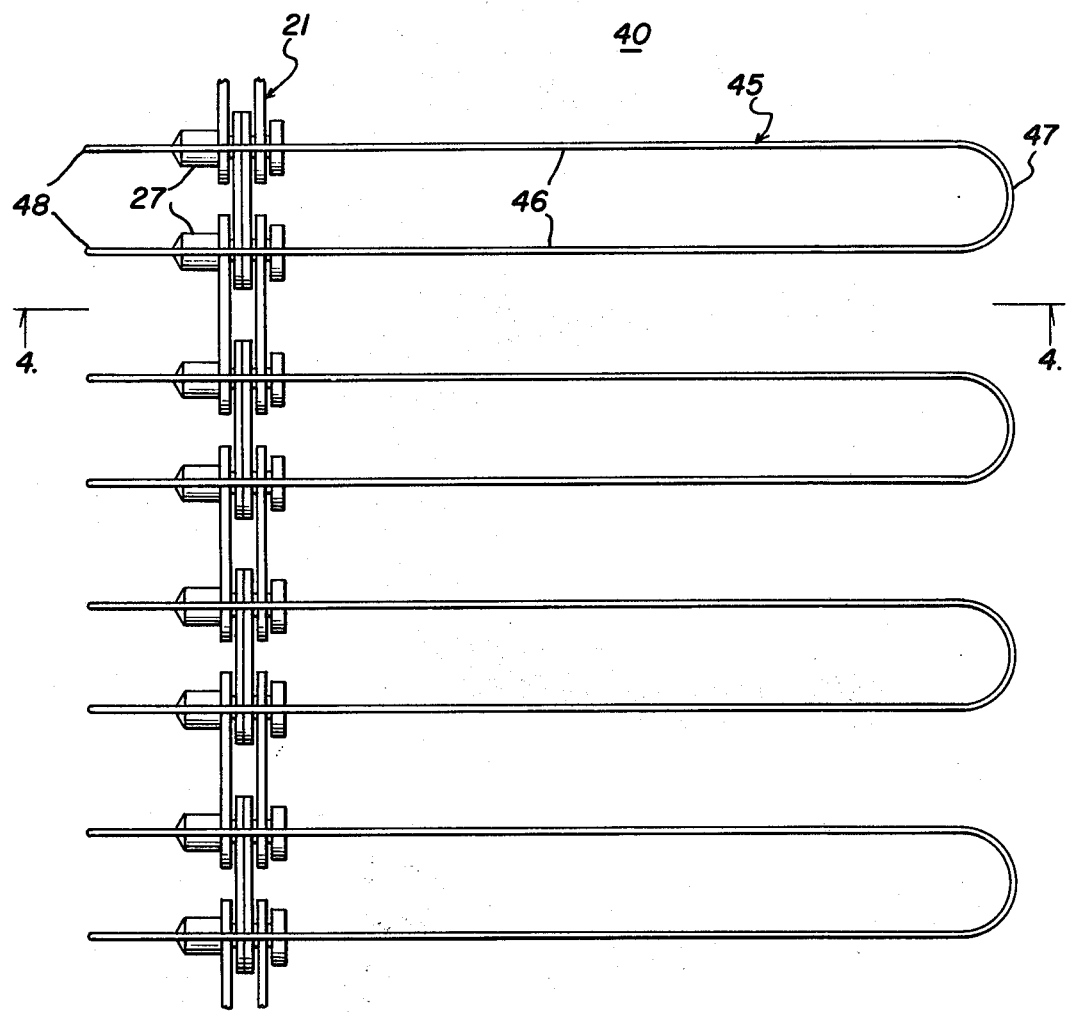
FIG. 3 is a fragmentary top plan view of an articulated roller chain conveyor having mounted thereon wire rod support members constructed in accordance with and embodying the features of a second embodiment of the present invention.
Figure 4:
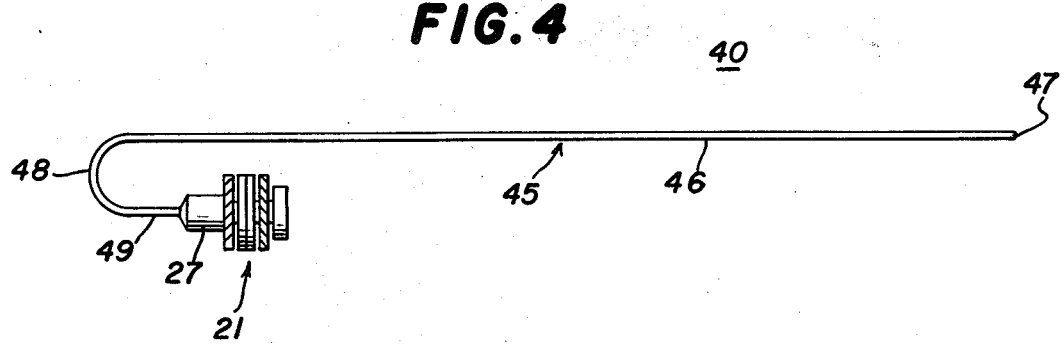
FIG. 4 is a view in vertical section, taken along the line 4—4 in FIG. 3.

Referring now to FIGS. 3 and 4 of the drawings, there is illustrated another embodiment of conveyor assembly, generally designated by the numeral 40, which includes the conveyor chain 21 described above in connection with the conveyor assembly 20 of FIGS. 1 and 2, with the exception that in this case the rod-end portions 27 of the pins 25 are all disposed on the same side of the chain 21. Mounted on the chain 21 are a plurality of wire rod members, each generally designated by the numeral 45. Each of the wire rod members 45 is preferably integrally formed of a single piece of wire rod and includes a pair of elongated parallel side portions 46 which overlie the chain 21 and extend laterally thereof, projecting much further beyond one side of the chain 21 than beyond the other side thereof. Preferably, the side portions 46 are respectively disposed directly over and parallel to two associated ones of the pins 25, the side portions 46 being interconnected at the ends thereof most remote from the chain 21 by an arcuate coplanar bight portion 47. The side portions 46 are respectively bent out of the plane thereof at the other ends thereof to form arcuate bight portions 48 respectively terminating in the straight end portions 49 respectively receivable in the sockets 28 of the corresponding pins 25.

The wire rod member 45 is so dimensioned that when thus mounted on the pins 25, the side portions 46 are spaced a predetermined distance above the chain 21 for cooperation with the bight portion 47 to form a support surface. It will be appreciated that along straight segments of the chain 21 the side portions 46 of the wire rod members 45 are substantially coplanar and cooperate to define a conveying surface for supporting articles to be conveyed by the conveyor assembly 40. It will also be understood that the wire rod members 45 can be readily and independently mounted and demounted with respect to the chain 21 by simple insertion and removal of the end portions 49 with respect to the pin sockets 28. While the wire rod members 45 have been illustrated as extending toward the right in FIG. 3, it will be understood that they could extend in either direction by appropriate adjustment of the orientation of the pins 25. The wire rod members 45 have the advantage of requiring no welding or other fastening means.

Referring now to FIGS. 5, 7 and 9 of the drawings, there is illustrated another embodiment of conveyor assembly, generally designated by the numeral 50, which includes an articulated conveyor chain, generally designated by the numeral 51, which is also of standard construction, but is slightly different from the construction of the conveyor chain 21. More particularly, the chain 51 includes a plurality of longitudinally spaced-apart pairs of first links 52 and longitudinally spaced-apart pairs of second links 53, the links 52 being laterally interleaved with the links 53 and longitudinally overlapping the ends thereof, with the overlapping ends of the links 52 and 53 being pivotally interconnected by pivot pins 54 received through complementary openings therein. Preferably, each of the links 52 and 53 is in the form of an elongated flat plate having rounded ends.

Disposed between adjacent ones of the pins 54 is a pair of T-bar mounting members, each generally designated by the numeral 55. While only one pair of T-bars 55 is illustrated in the drawings, it will be understood that similar pairs of T-bars 55 will be disposed along the chain 51 at predetermined spacings. Each of the T-bars 55 includes a hollow tubular top portion 56 which overlies the chain 51 and extends laterally thereof in use, projecting equidistantly beyond the opposite sides thereof a predetermined short distance. Integral with the tubular top portion 56 substantially midway between the ends thereof and projecting downwardly therefrom substantially normal thereto is a stem portion 57 provided at the distal end thereof with a laterally extending hook 58. In use, the T-bars 55 are longitudinally spaced apart with the stem portions 57 thereof extending transversely through the chain 51, preferably between one of the pairs of links 52 or 53, with the stem portions 57 disposed substantially normal to the longitudinal axis of the chain 51 and projecting a predetermined distance therebelow. The lower ends of the stem portions 57 are interconnected by a suitable clip 59, which may be an integral metal loop or the like which is press fitted over the hooks 58 and cooperates therewith and with the bottom edges of the links 52 or 53 to prevent removal of the T-bars 55 from the chain 51.

Mounted on the T-bars 55 is a wire rod member, generally designated by the numeral 60, which is preferably integrally formed of a single piece of material and includes an elongated midportion 61 which extends through the tubular top portion 56 of one of the T-bars 55 and extends laterally well beyond the ends of the T-bar 55, preferably equidistantly on each side of the chain 51. The opposite ends of the midportion 61 are preferably joined by arcuate bight portions (not shown) to elongated coaxial end portions 62 and 63 which are parallel to the midportion 61 and are respectively received in the opposite ends of the tubular top portion 56 of the other T-bar 55 to complete a wire rod loop which defines a support surface for conveyed articles. It will be understood that all of the wire rod members 60 along a straight length of the conveyor assembly 50 are substantially coplanar and cooperate to define a conveying surface for supporting articles to be conveyed by the conveyor assembly 50.

In the embodiment illustrated in FIG. 5, the stem portions 57 of the T-bars 55 are substantially parallel, with the width of the loop formed by the wire rod member 60 being determined by the longitudinal spacing $D_1$ between the T-bars 55. Referring now to FIGS. 6 and 7 of the drawings, there is illustrated an alternative form of the conveyor assembly 50 wherein the spacing between the tubular portions 56 of the T-bars 55 is increased to a distance $D_2$ to increase the width of the loop formed by the wire rod member 60. In this embodiment the stem portions 57 of the T-bars 55 are disposed at an angle to the vertical so as to converge downwardly. In this arrangement the lower ends of the stem portions 57 are closer together and are locked in place by a clip member 59a which is substantially the same as the clip member 59 but is somewhat shorter. Additionally, there is disclosed a top clip 65 which interconnects the stem portions 57 at the upper ends thereof and preferably includes two apertures therethrough for respectively receiving the stem portions 57 to maintain the desired spacing between the tubular portions 56.

Referring to FIG. 10 of the drawings, there is illustrated an alternative form of clip member, generally designated by the numeral 70, for securing the T-bars 55 to only one of the chain links 52 or 53, so that the stem portions 57 of the T-bars 55 may, if desired, be disposed outboard of the pairs of links 52 or 53 rather than therebetween. Also, this arrangement permits mounting of the T-bars 55 on chains wherein the links are arranged singly rather than in pairs. The clip 70 includes a generally rectangular vertical wall 71 which has a vertical extent slightly greater than the vertical extent of the associated one of the links 52 or 53 and has a longitudinal extent sufficient to encompass both of the T-bars 55 in a pair thereof. Respectively integral with the vertical wall 71 along the upper and lower edges thereof and extending laterally therefrom are a top flange 72 and a bottom flange 73 which are respectively provided with vertically aligned apertures therethrough for receiving the stem portions 57 of the T-bars 55. In use, the top and bottom flanges 72 and 73 respectively bracket the associated link 52 or 53 and cooperate therewith and with the hooks 58 of the stem portions 57 to prevent removal of the T-bars 55 from the chain 51.

Figure 11:
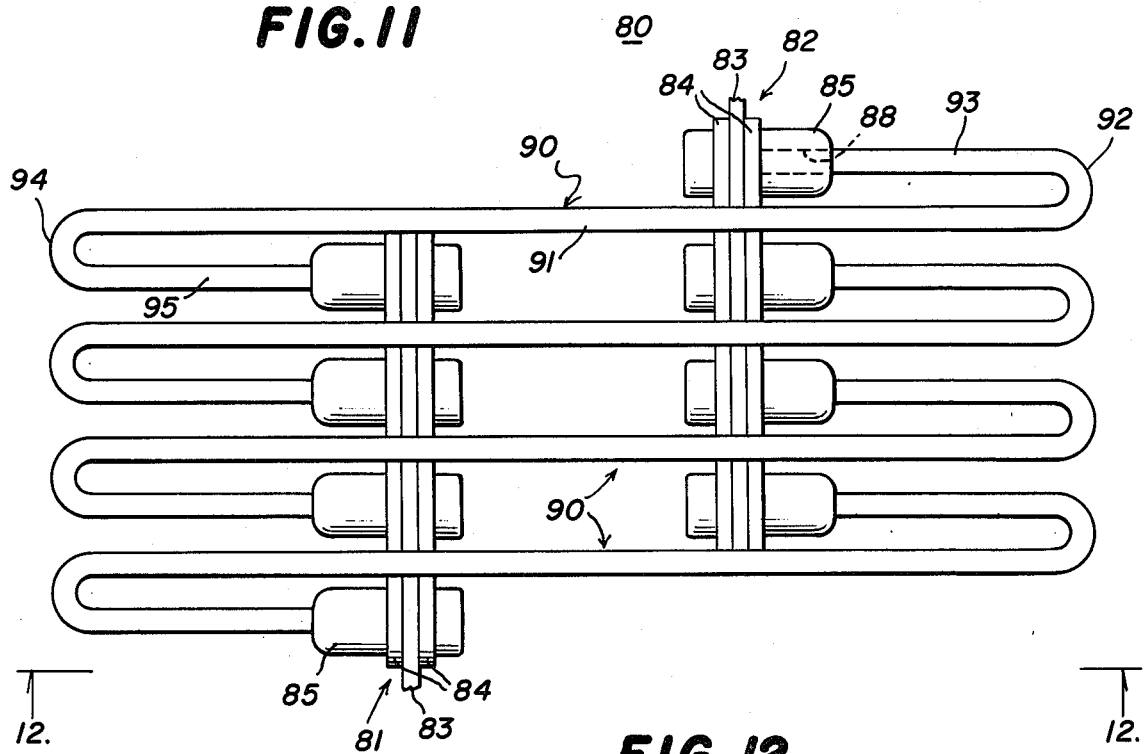
FIG. 11 is a fragmentary top plan view of a double-chain conveyor having mounted thereon wire rod support members constructed in accordance with and embodying the features of a fifth embodiment of the present invention.
Figure 12:
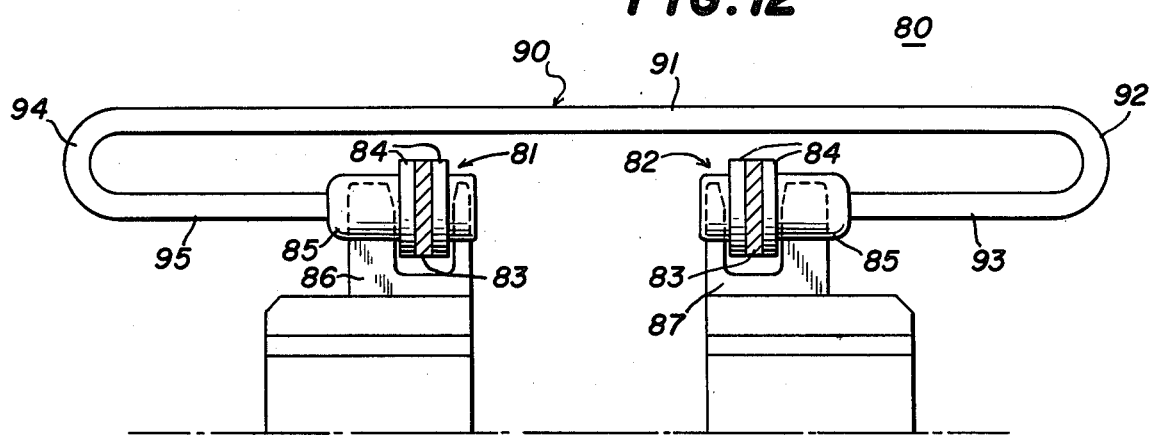
FIG. 12 is a view in vertical section taken along the line 12—12 in FIG. 11 and showing portions of the drive sprockets for the conveyor chains.
Figure 13:
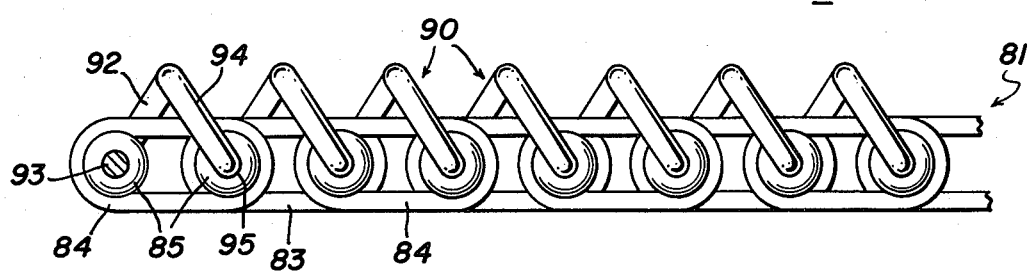
FIG. 13 is a side elevational view of the portion of the apparatus illustrated in FIG. 11, as viewed from the left-hand side thereof.

Referring now to FIGS. 11 through 13 of the drawings, there is disclosed yet another embodiment of conveyor assembly, generally designated by the numeral 80, which includes two parallel and laterally-spaced apart articulated conveyor chains 81 and 82. Each of the chains 81 and 82 includes a plurality of longitudinally spaced-apart inner links 83 and a plurality of longitudinally spaced-apart pairs of outer links 84, with the adjacent ends of the inner and outer links 83 and 84 being disposed in longitudinally overlapping relationship and being pivotally interconnected by pins 85, each of which is provided with an axial bore or socket 88 in the outer end thereof, all in standard fashion. The chains 81 and 82 are driven by sprockets 86 and 87, respectively, and the conveyor assembly 80 may also be provided with guide rails (not shown) for guiding the conveyor chains 81 and 82 around curves.

Mounted on the conveyor chains 81 and 82 and extending therebetween are a plurality of longitudinally spaced-apart wire rod members, each generally designated by the numeral 90. Each of the wire rod members 90 is preferably formed of a single piece of material and includes an elongated straight top portion 91 which overlies and spans the conveyor chains 81 and 82 and extends substantially equidistantly outwardly beyond the outer sides thereof. The opposite ends of the straight top portion 91 are respectively joined by arcuate bight portions 92 and 94 to straight end portions 93 and 95. The bight portion 92 is curved downwardly and forwardly toward one end of the chains 81 and 82, while the bight portion 94 is curved downwardly and rearwardly toward the other end of the chains 81 and 82, so that the end portions 93 and 95 are spaced both longitudinally and vertically from the top portion 91 and are arranged substantially parallel thereto. The end portion 93 is received in the socket 88 of a corresponding one of the pins 85 of the conveyor chain 82, while the end portion 95 is received in the socket 88 of a corresponding pin 85 of the conveyor chain 81 which is spaced longitudinally of the chains from the pin 85 in which the end portion 93 is received. Thus, because the end portions 93 and 95 are not coaxial, the wire rod member 90 will not be subject to pivotal movement with respect to the conveyor chains 81 and 82.

The wire rod members 90 are so dimensioned and shaped that, when thus mounted on the conveyor chains 81 and 82, the straight top portions 91 are spaced vertically a predetermined distance above the conveyor chains 81 and 82, with the top portions 91 all being substantially coplanar. It will be appreciated that these top portions 91 of the wire rod members 90 cooperate to define a conveyor surface for supporting articles to be conveyed by the conveyor assembly 80. While the bight portions 92 and 94 of the wire rod members 90 have been illustrated as inclined to the vertical so that the straight top portions 91 may be disposed substantially normal to the longitudinal axes of the conveyor chains 81 and 82, it will be appreciated that the bight portions 92 and 94 could be vertically arranged, with the straight top portions 91 being angularly disposed with respect to the longitudinal axes of the conveyor chains 81 and 82. It will also be appreciated that the lateral spacing between the conveyor chains 81 and 82 may be varied as desired, with appropriate adjustment of the lengths of the wire rod members 90.

From the foregoing, it can be seen that there has been provided a unique conveyor system for providing wire rod article-support members which can readily be mounted on articulated conveyor chains having links interconnected by socketed pins, without the use of any special attachment members.

Further, there has been provided two embodiments of such assemblies wherein the wire rod support members are integrally formed of single pieces of material which can be mounted without the necessity of any welding or other fastening means, one such embodiment being adapted for use with a single-chain conveyor and the other for use with a double-chain conveyor.

There has also been disclosed a unique conveyor assembly which includes novel T-bar mounting members for mounting wire rod support members on various types of articulated chain conveyors, whether or not they include socketed pins.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Apparatus for providing a support surface for carrying goods and the like on an articulated chain conveyor having a plurality of links joined together by connecting pins extending laterally of the conveyor and each having a socket formed axially therein for receiving an end of an associated wire rod, said apparatus comprising a rod structure having two ends respectively received in the sockets of two adjacent ones of the associated pins, said rod structure having a support portion overlying the chain in use and extending laterally therebeyond substantially parallel to the axes of the associated pins to provide a support surface, a plurality of said rod structures mounted on the chain providing a conveying surface for transporting articles.

2. The apparatus set forth in claim 1, wherein said rod structure is formed of metal wire.

3. The apparatus set forth in claim 1, wherein said support portion extends laterally substantially the same distance beyond both sides of the associated chain.

4. The apparatus set forth in claim 1, wherein said support portion extends laterally beyond one side of the associated chain a distance substantially greater than the distance it extends beyond the other side of the chain.

5. Apparatus for providing a support surface for carrying goods and the like on an articulated chain conveyor having a plurality of links joined together by connecting pins each having a socket formed axially therein for receiving an end of an associated rod, said apparatus comprising two curved rod segments respectively coupled to two adjacent ones of the associated pins, each of said rod segments having one end thereof received in the associated pin socket and having the other end thereof extending upwardly above the conveyor chain, and a continuous rod loop fixedly secured to the upper ends of said two rod segments and extending laterally outwardly therefrom to provide a support surface, a plurality of said apparatuses mounted on the chain providing a conveying surface for transporting articles.

6. The apparatus set forth in claim 5, wherein each of said rod segments and said rod loop are formed of metal wire, said rod loop being secured to said rod segments by welding.

7. The apparatus set forth in claim 5, wherein said rod loop includes two elongated parallel straight portions spaced apart longitudinally of the chain and extending laterally outwardly beyond the opposite sides thereof, and two bight portions respectively interconnecting the opposite ends of said straight portions.

8. The apparatus set forth in claim 5, wherein said rod loop includes a first member having two parallel elongated straight side portions spaced apart longitudinally of the chain and extending laterally beyond the opposite sides thereof and a bight portion interconnecting said straight portions at one end thereof, and a bight member fixedly secured to the other ends of said straight portions for interconnecting same.

9. Apparatus for providing a support surface for carrying goods and the like on an articulated chain conveyor having a plurality of links joined together by connecting pins extending laterally of the conveyor and each having a socket formed axially therein for receiving an end of an associated rod, said apparatus comprising a one-piece curved rod member having two ends respectively received in the sockets of two adjacent ones of the associated pins, said rod member having a support portion overlying the associated chain and extending laterally therebeyond substantially parallel to the axes of the associated pins to provide a support surface, a plurality of said rod structures mounted on the chain providing a conveying surface for transporting articles.

10. The apparatus set forth in claim 9, wherein said ends of said curved rod member extend into the sockets of the two adjacent ones of the associated pins in the same direction.

11. The apparatus set forth in claim 9, wherein said curved rod member is formed of metal wire.

12. The apparatus set forth in claim 9, wherein said support portion extends laterally beyond one side of the associated chain a distance substantially greater than the distance it extends beyond the other side of the chain.

13. Apparatus for providing a support surface for carrying goods and the like on a conveyor including two parallel articulated chains each having a plurality of links joined together by connecting pins extending laterally of the conveyor with each pin having a socket formed axially therein for receiving an end of an associated rod, said apparatus comprising a one-piece curved rod member having two ends, one of said ends being received in a first direction into the socket of an associated pin of one of the conveyor chains, said other end being received in a second direction opposite to said first direction into the socket of an associated pin of the other conveyor chain spaced longitudinally of said chains from the pin in which said one end is received, said rod member having a support portion overlying the associated chains and extending therebetween substantially parallel to the axes of the associated pins to provide a support surface, a plurality of said rod members mounted on the chains providing a conveying surface for transporting articles.

14. The apparatus set forth in claim 13, wherein each of said ends of said curved rod member extends into the associated pin socket in a direction from the outside toward the inside of the associated conveyor chain.

15. The apparatus set forth in claim 13, wherein said curved rod member is formed of metal wire.

16. Apparatus for providing a support surface for carrying goods and the like on an articulated chain conveyor having a plurality of links joined together by connecting pins, said apparatus comprising a pair of mounting members spaced apart longitudinally of the chain between two adjacent pins thereof, each of said mounting members including a hollow tubular portion disposed on the outer side of the chain and extending laterally transversely thereof for support thereon and a stem portion integral with said tubular portion intermediate the ends thereof and extending therefrom normal thereto and normal to the longitudinal axis of the chain to and beyond the inner side of the chain, coupling means coupling said mounting member to an associated link of the chain, and a one-piece curved rod member having a midportion extending through one of said tubular portions and two end portions respectively received in the other of said tubular portions from the opposite ends thereof, a plurality of said apparatuses mounted on the chain providing a conveying surface for transporting articles.

17. The aparatus set forth in claim 16, wherein each of said mounting members is substantially T-shaped.

18. The apparatus set forth in claim 16, wherein each of said stem portions extends between laterally spaced-apart portions of the conveyor chain links, said coupling means comprising a clip disposed along the inner side of the associated chain and engageable with the inner ends of said stem portions and with the associated link portions for preventing removal of said mounting members from between the link portions.

19. The apparatus set forth in claim 16, wherein said stem portions are disposed in use parallel to each other and substantially normal to the longitudinal axis of the associated chain.

20. The apparatus set forth in claim 16, wherein said stem portions converge inwardly of the associated chain, said coupling means including an outer clip maintaining said hollow tubular portions in spaced-apart relationship and an inner clip disposed in engagement with the inner ends of said stem portions and with the associated link for preventing removal of said mounting members from the chain.

21. The apparatus set forth in claim 16, wherein each of said stem portions has an enlarged head portion at the inner end thereof, said coupling means comprising a clip having a main wall extending along the one side of the associated link from the inner edge to the outer edge thereof, an upper flange integral with said main wall and extending along the outer edge of the link and surrounding the stem portions of said mounting members, and a lower flange integral with said main wall and extending along the inner edge of the associated link and surrounding said stem portions of said mounting members between said head portions thereof and the associated link, said clip being engageable with said head portions to prevent removal of said mounting members from the associated link.

22. An assembly for providing a support surface for carrying goods and the like on an articulated chain conveyor having a plurality of links joined together by connecting pins extending laterally of the chain and each having a socket formed axially therein for receiving an end of an associated wire rod, said assembly comprising a plurality of rod structures spaced apart longitudinally of the associated chain, each of said rod structures having two ends respectively received in the sockets of two adjacent ones of the associated pins, each said rod structure having a support portion overlying the chain conveyor and extending laterally therebeyond substantially parallel to the axes of the associated pins to provide a support surface, said rod structures cooperating to provide a conveying surface for transporting articles.

23. The assembly of claim 22, wherein the ends of adjacent ones of said rod structures extend laterally into the associated pin sockets in opposite directions.

24. The assembly set forth in claim 22, wherein the ends of adjacent ones of said rod structures extend laterally into the associated pin sockets in the same direction.

25. An assembly for providing a support surface for carrying goods and the like on an articulated chain conveyor having a plurality of links joined together by connecting pins, said assembly comprising a plurality of pairs of mounting members spaced apart longitudinally of the chain, the mounting members of each pair of mounting members being disposed between two adjacent pins of the chain and being spaced apart, each of said mounting members including a hollow tubular portion disposed on the outer side of the chain and extending laterally transversely thereof for support thereon and a stem portion integral with said tubular portion intermediate the ends thereof and extending therefrom normal thereto and normal to the longitudinal axis of the chain to and beyond the inner side of the chain, a plurality of coupling means respectively coupling said pairs of mounting members to associated links of the chain, and a plurality of one-piece curved rod members equal in number to and respectively coupled to said pairs of mounting members, each rod member having a midportion extending through one of said tubular portions of the associated pair of mounting members and two ends respectively received in the other of the associated pair of tubular portions from the opposite ends thereof, said rod members cooperating to provide a conveying surface for transporting articles.

* * * * *